Jan. 10, 1956 — E. R. DOAK — 2,730,311
IMPELLER PROPELLED AERODYNAMIC BODY
Filed July 1, 1950 — 2 Sheets-Sheet 1
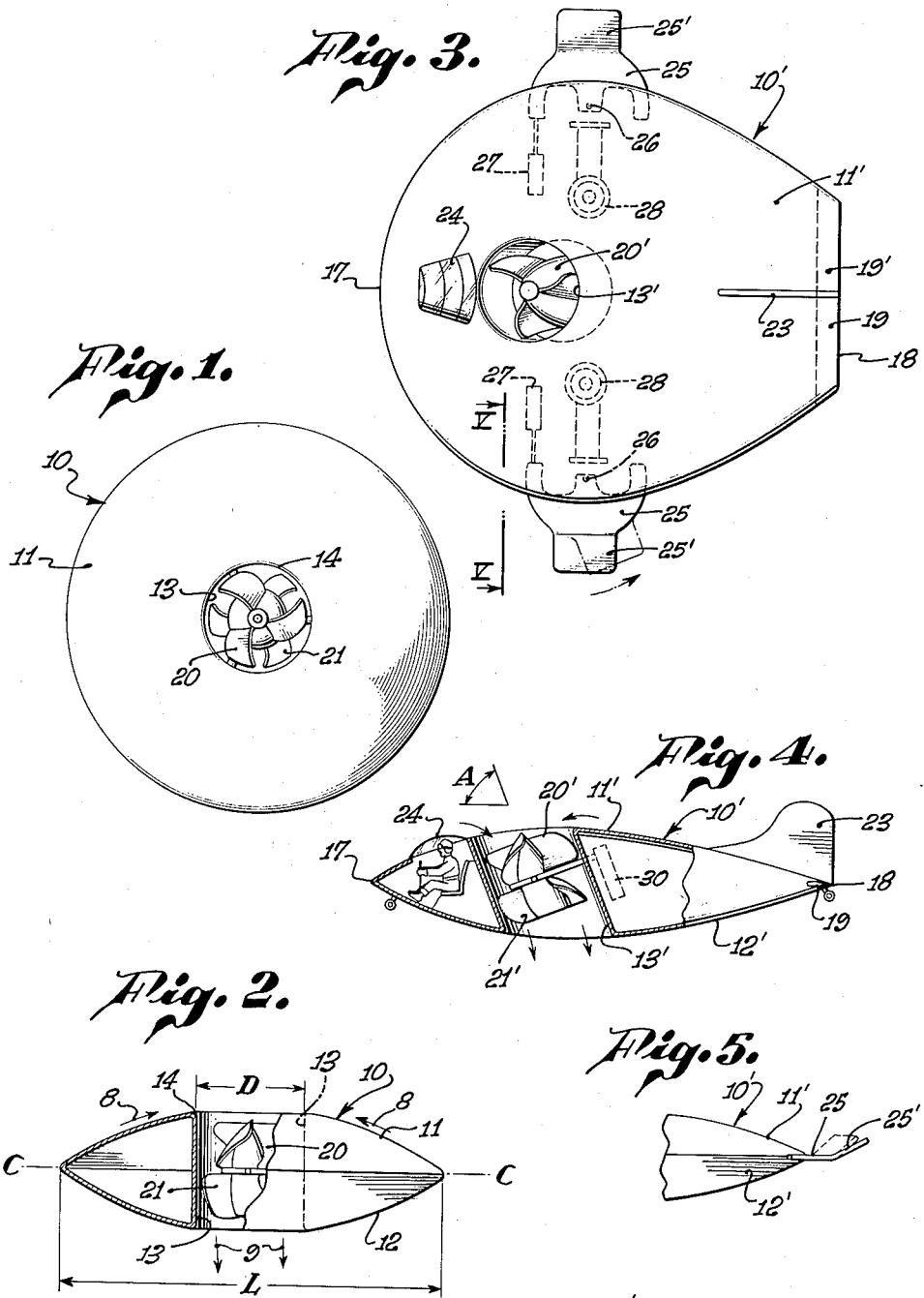
EDMOND R. DOAK,
INVENTOR.
BY
ATTORNEY.

Jan. 10, 1956

E. R. DOAK 2,730,311

IMPELLER PROPELLED AERODYNAMIC BODY

Filed July 1, 1950

EDMOND R. DOAK,
INVENTOR.

BY

ATTORNEY.

United States Patent Office 2,730,311
Patented Jan. 10, 1956

2,730,311

IMPELLER PROPELLED AERODYNAMIC BODY

Edmond R. Doak, Los Angeles, Calif.

Application July 1, 1950, Serial No. 171,705

20 Claims. (Cl. 244—12)

This invention relates to means for aerial propulsion and is particularly directed to aerodynamic units which may be employed singly or in combination in the construction of aircraft having novel characteristics. The invention pertains to means and methods whereby compact, highly maneuverable aircraft may be constructed, such aircraft being characterized by freedom from normal propellers or airscrews. The invention also relates to aerodynamic units and component parts whereby high lifting forces may be generated by the passage of air over airfoils, such air being also converted into thrust jets which, properly directed and controlled, impart both lift and a forward velocity component.

Since the aerodynamic unit results in an aircraft having relatively low landing speeds and capable of rising in a substantially vertical manner, the aerodynamic unit of this invention may be compared with helicopters. Prior helicopters do not compare favorably with their airplane counterparts, since the maximum lift-drag ratio of a contemporary helicopter varies from about 5 to 8 and has not been known to exceed 10, whereas the lift-drag ratio of an airplane may be of the order of 12 to 22. However, in many instances, it is desirable to have an aircraft capable of substantially vertical ascent and descent.

Prior helicopter design (and by this term there are included the so-called gyroplane and autogiro) was beset with many problems both mechanical and physical. The necessity of hinging the blades in such manner as to allow them a certain freedom of movement in a flapping plane as well as the provision of vertical hinges or articulations permitting some movement of the rotor blade about a substantially vertical axis has given rise to numerous mechanical problems. The coriolis effect produced by the upward movement of the blade during rotation gives rise to vibrations of a destructive nature and requisite care must be taken in order to minimize the hunting oscillation of a blade about the vertical hinge, to increase the natural frequency of the blade in the plane of rotation, to minimize the violent rocking of a helicopter during the starting or stopping of the rotor and other resonance conditions of hazardous character. Moreover, large diameter helicopter blades cannot be employed and blade-tip speeds must be kept within reasonable limits.

The present invention obviates all of the difficulties encountered with contemporary helicopters and permits the construction of aircraft having the hovering characters of the helicopter without the use of rotor blades, the mechanical constructions which characterize helicopters, and without the mechanical and physical limitations of contemporary helicopters. Generally stated, the aerodynamic unit of the present invention comprises a body having airfoil attributes in that it has an upper, generally convex surface and a lower, generally convex surface, said surfaces meeting, in part at least, to form entering and trailing edges. Such body of airfoil characteristics is provided with one or more ports extending from the upper surface through the body and discharging at the lower surface, thereby forming passageways provided with virtually imperforate walls and preferably inclined, downwardly and rearwardly, at an angle of between about 30° and 85° to a plane passing through the entering and trailing edges of the body. Such a passageway is in confluent, smooth, transitional relation to the upper surface of the body so as to permit smooth flow of air over such upper surface and into the passageway. Positioned in such passageway are means for inducing flow of air over the adjacent convex surfaces and into the passageway, such means preferably including devices or means for compressing the air and discharging the air at high velocity and considerable pressure as a jet at a desired angle to the plane connecting the entering and trailing edges. The means for inducing flow of air and generating high velocity fluid flow through each passageway preferably includes bladed elements of novel design, said blended elements preferably consisting of adjacent sections rotating in opposite directions and at controllable speeds, thereby controlling rotational torque and permitting such thrust-generating elements to be used, in part at least, as means for controlling the direction of flight. The invention further coatemplates the provision of starvers and other control elements whereby rolling, turning and pitching may be regulated and controlled.

It is an object of the present invention, therefore, to disclose and provide novel aerodynamic units.

Another object of the invention is to disclose and provide an aerodynamic unit embodying impellers and vertical reaction generators positioned wholly within passageways extending through an airfoil structure.

A still further object of the invention is to disclose and provide an aerodynamic unit including means which overcome the normal differential pressure between the upper and lower surfaces and generate sufficient lift to permit vertical flight without need of forward motion, the unit or airfoil body being capable of gliding flight, when desired.

Again, an object of the present invention is to disclose and provide improved thrust-generating means which are compact and are adapted to produce a vertical reaction in excess of 30 lbs. per square foot of cross-sectional area of such impeller means.

A still further object of the invention is to disclose and provide various controls and methods of control whereby pitching, rolling, turning and direction of flight may be adequately and simply regulated.

These and various other objects, uses and advantages of the present invention will become apparent to those skilled in the art from the following, more detailed description of exemplary forms embodying the invention, it being understood that the aerodynamic unit and its various appurtenances and auxiliary means may be embodied in a great variety of aircraft, depending upon the requirements of such aircraft. In the appended drawings:

Figs. 1 and 2 are diagrammatic representations of a simple aerodynamic unit embodying the present invention, Fig. 1 being in plan and Fig. 2 being in side elevation partly broken away.

Fig. 3 is a plan view, partly diagrammatic, of the aerodynamic unit of the present invention in the form of an aircraft.

Fig. 4 is a longitudinal section through the aircraft of Fig. 3.

Fig. 5 is a transverse section taken approximately along the plane V—V in Fig. 3.

Figure 6:
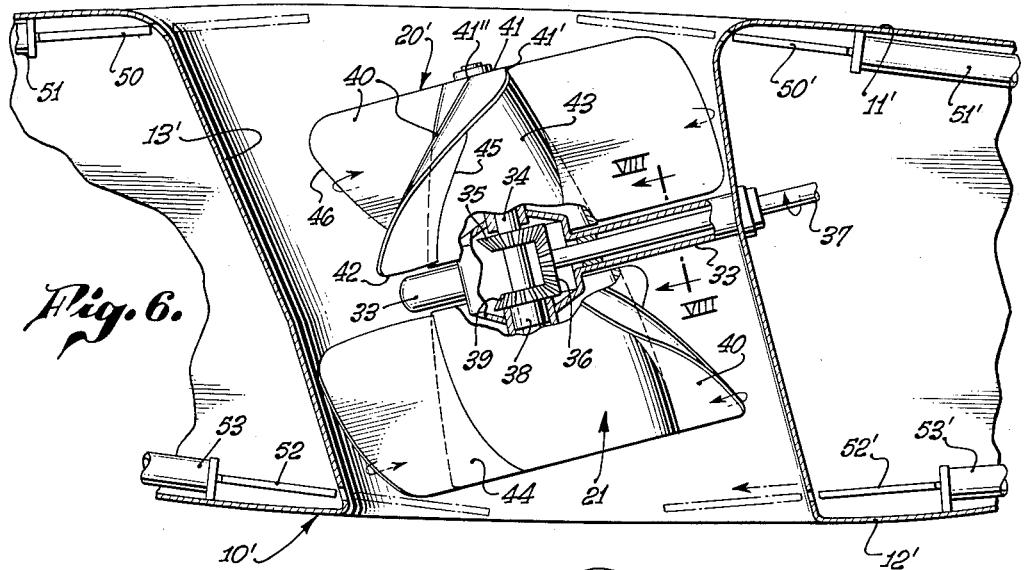
Fig. 6 is an enlarged view through a passageway in an aerodynamic unit of the present invention, illustrating one form of thrust-generating means and control elements.

The elementary form of aerodynamic unit illustrated in Figs. 1 and 2 comprises a body, generally indicated at 10, which has a discus-like form including an upper, generally convex surface 11 and a lower, generally convex surface 12, the margins of the upper and lower surfaces being connected so as to form entering and trailing edges. The chord or plane connecting such entering and trailing edges is indicated at C—C, the length of the body between the entering edge and trailing edge being indicated at L (Fig. 2).

A passageway 13 extends through the body 10, said passageway being provided with virtually imperforate walls and with gradually rounded, smooth, contiguous portions 14 merging the upper surface 11 into the walls of the passageway 13, such smooth, confluent relationship between the passageway and such upper surface being hereinafter referred to as an anastomotic relation.

Preferably, the axis of the passageway 13 passes through the chord C—C at a point located between 0.3 and 0.5 of the length of such chord from the leading edge. Furthermore, it may be stated that the average diameter of such passageway 13, indicated at D, comprises between about 0.1 and 0.4 of the length of the chord C—C between entering and trailing edge. These relationships are of particular importance when the aerodynamic unit is embodied in a complete aircraft.

Mounted within the passageway 13 are power-driven means for drawing large volumes of air into the passageway along the upper surface 11, as indicated by the arrows 8, and discharging such air at high velocity downwardly in a direction parallel to the axis of the passageway, as indicated by the arrows 9, thereby forming a downwardly directed jet and creating lift along the upper surfaces.

Such thrust-generating and lift-producing means may comprise two or more impeller sections, generally indicated at 20 and 21, mounted coaxially and provided with means for rotating such sections in opposite directions. Each of said sections 20 and 21 is provided with a plurality of blades specifically designed (as will become apparent hereafter) to efficiently draw in air, compress the same and eject the air in the form of a thrust-jet in a direction parallel to the axis of rotation of the impellers and impeller sections. By employing counter-rotating impeller sections, torque is counteracted and no auto-rotational effect is imposed upon the body 10.

It may be noted here that each of the impeller sections 20 and 21 preferably has an axial length in excess of 20% of its diameter. The blades carried by each section are provided with outer margins which are in proximity to the wall 13 of the passageway for a distance not materially shorter than the axial length or height of the blades of the impeller section. The blades of each impeller section are carried upon a hub portion and each of the blades is preferably provided with a front face concave in section taken perpendicular to the shaft, as will be described in greater detail hereinafter.

Figs. 1 and 2 therefore disclose the general relationships of the parts and the mode of operation of the aerodynamic unit. The application of these general principles to an aircraft is exemplified by Figs. 3–5. As there shown, the aircraft comprises a body portion 10' which is generally discus-like in shape. The upper, convex surface is indicated at 11'; the lower convex surface is indicated at 12'. These surfaces meet at a leading edge generally indicated at 17; a trailing edge is indicated at 18. Portions of the body adjacent the trailing edge 18 may include flaps or pivoted, virtually horizontal elevator planes 19 and 19'. A vertical rudder fin is indicated at 23.

A bubble-like canopy 24 is indicated in the forward part of the aircraft for pilot and copilot. The sides of the craft may be provided with stabilizers such as the fin-like members 25 provided with upwardly inclined outer portions 25'. These stabilizers may be mounted for pivotal movement upon substantially vertical axis 26 and means may be provided for controllably positioning said stabilizers at various angles around such axis, such means being diagrammatically illustrated at 27.

The operating and control means may be hydraulic or electrical and are not shown in detail since servo mechanisms of any well-known type may be used in adjustably and controllably positioning such stabilizers 25. It is to be understood that such stabilizers 25 extend through suitable tlits or openings formed adjacent or in the edge of the aircraft for movement therein. Suitable landing gear, diagrammatically indicated at 28, and capable of being retracted into the body 10' are also provided, such landing gear being again operated by any desired type of servo mechanism.

A passageway 13' extends through the body 10', the relationship between the diameter of the body and the chord length being within the limits stated hereinbefore during consideration of Figs. 1 and 2. The axis of the passageway 13' is preferably inclined downwardly and rearwardly at an angle of between 30° and 85° to the plane passing through the entering and trailing edges of the body 10', such angle being indicated as the angle A in Fig. 4. The axis of the passageway passes through the body at a point located between 0.3 and 0.5 of the length of the chord from the leading edge 17 and such position is also correlated at the center of gravity of the unit and the center of pressure of the surfaces of the unit. This requires that consideration be had of the weight of the entire body, including its various accessories and appurtenances (such as the landing gear 28) and of a motor, generally indicated at 30, positioned within the body and used in driving the impeller sections 20' and 21' which are positioned within the passageway and conform in general to the description given hereinbefore of the sections 20 and 21.

It will be evident that by reason of the inclination of the passageway 13', a forward component is generated by the downwardly and rearwardly directed thrust of the air jet. In forward flight, the chord C—C assumes a virtually horizontal plane; when landing, the forward portion of the craft and the leading edge assume an angle of attack wherein the chord is inclined downwardly and rearwardly, this attitude characterizing the position of the aircraft when at rest, when hovering, and when rising vertically.

It will be noted that in all instances large volumes of air are drawn over the upper surface of the aerodynamic unit, thereby generating lift; in all instances a downwardly directed jet imparts upward and forward thrust.

Figure 7:
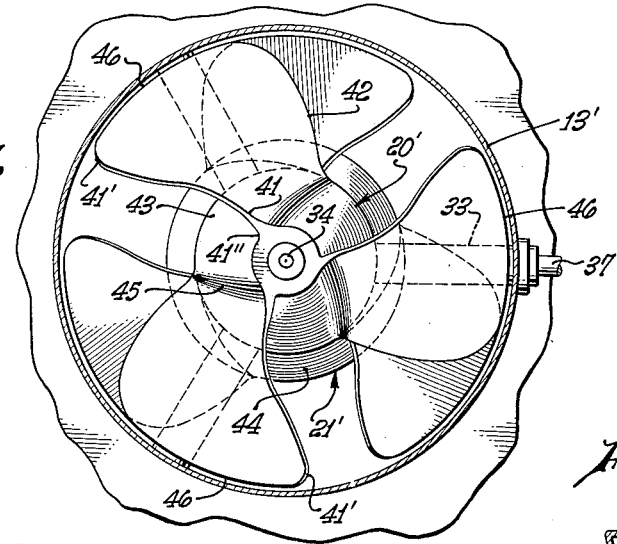
Fig. 7 is an end view of the passageway and thrust-generating means illustrated in Fig. 6.

By referring to Figs. 6 and 7 which are, in effect, a vertical enlarged section taken along the plane VI—VI in Fig. 5 and an enlarged view, in plan, in a direction parallel to the axis of the passageway, it will be seen that the walls of the passageway 13' can be contoured somewhat so that the passageway is of varying diameter. In the example given, the inlet portion of the passageway is larger than the discharge area, the walls of the passageway converging for a portion of their length and then becoming parallel. Extending transversely across such passageway is a spider having arms, such as the arm 33, such spider supporting a centrally disposed bearing assembly for a vertical shaft 34 upon which there is mounted the upper impeller assembly 20'. It is desired that this upper impeller assembly rotate in one direction, whereas the lower impeller assembly 21' rotate in the opposite direction. Although various forms of drives may be employed, a simple exemplary drive is shown in the drawings and includes a bevel gear 35 mounted upon the shaft 34, such bevel gear being in engagement with gear 36 mounted upon the end of drive shaft 37 extending through the hollow arm 33 of the spider. The shaft 37 is suitably connected to a motor, not shown. The lower portion of shaft 34 has a sleeve 38 journaled therein, such sleeve carrying a bevel gear 39 which is also in engagement with gear 36. It will be evident that by this arrangement shaft 34 is rotated in one direction, whereas the sleeve 38 is rotated in the opposite direction. The lower impeller assembly 21' is mounted upon sleeve 38.

It is to be remembered that the thrust-generating means, such as the impeller sections 20' and 21', needs induce flow of air along the upper surfaces 11', compress such air and eject it forceably downwardly, preferably in a direction substantially parallel to the axis of the passageway 13'. In order to develop utilizable thrust in excess of 30 lbs. per square foot of cross-sectional area of the passageway, it is impracticable to use normal blower or propeller assemblies and instead, it is necessary to use carefully designed bladed elements of the character to be described in detail at this point. As shown in Figs. 6 and 7, each of the impeller sections carries a plurality of blades, such as the blade 40. Each blade has a front face which is concave in section taken perpendicular to the shaft and such concavity extends from the upper, generally radial inlet edge identified at 41 to the generally radial outlet edge identified at 42. It may be noted that the blades are preferably mounted upon a hub or hub section of varying diameter from inlet to outlet end. These hubs, such as the hub portions 43 and 44, form a core which, in combination with the varying diameter of the walls of the passageway 13', cooperate with the blades of each impeller section in facilitating compression of air and its discharge as an axial thrust jet. It may be noted at this time that at the discharge port of the entire passageway, the cross-sectional area of the hub in that zone preferably comprises 15% or more of the total cross-sectional area defined by the walls of the passageway and preferably ranges from between about 20% of such passageway to approximately 35% thereof. Differently stated, the ratio of hub area to total passageway area in a transverse plane adjacent the outlet is not less than 0.15 to 1.0.

Each of the blades, such as the blade 40, may also be defined by a root line adjacent the shaft, such as the root line 45 at the surface of the hub 43 and an outer edge, indicated at 46, which is arranged to come into proximity with the wall of the passageway 13' from substantially the upper radial edge 41 to the plane of the lower radial edge 42, due regard being given to rounding of sharp corners and mechanical considerations. The outer edge 46 of each blade is preferably between an angle of 35° and 60° to the shaft axis and approximates a portion of a helix. The outer margin of each radial edge, such as the point 41', is angularly in advance of the root margin of such edge, such as the point 41", by a radial angle of between about 5° and 50°. These requirements insure the formation of blades having concave surfaces adapted to scoop in large volumes of air and rapidly, with a minimum expenditure of energy, impart axial movement to such air. The number of blades carried by an impeller section may be varied; three-bladed impellers are shown in the drawings for illustrative purposes only, and in actual practice a larger number, say six, is commonly employed. As shown by the drawings, the use of three or more blades of high angle (35° to 60°) to the axis of rotation produces an impeller of high solidity (i. e. when viewed axially a high proportion of the total transverse area is intercepted by the impeller) and this insures the generation of exceptionally high axial reaction or thrust obtained by this invention. In practice, it has been found that the axial height of the blades, that is the distance between the plane of the radial inlet edges 41 and the radial outlet edges 42, should be in excess of 20% of the outer diameter of such blade assembly, thereby permitting the formation of smooth air flow without excessive turbulence within the passageway. The various impeller sections may operate at equal speeds or at different speeds and turning movement of the entire aircraft may be obtained by controllably varying the relative speeds of the impeller sections.

Figure 8:
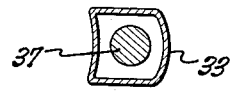
Fig. 8 is a section taken along the plane VIIII—VIII in Fig. 6.

It may also be noted that by reason of the fact that the outer margins of each radial edge are in advance of the root margin of such edge by an appreciable angle, the transition of air from one impeller section to another impeller section is obtained very effectively without the creation of resonant vibrations, a slip stream of air discharged by impeller section 20' being, in effect, gradually sheared and received by the succeeding impeller section 21', and not chopped off in toto in a single instant of time. The impeller sections such as 20' and 21' should be as close together as possible. When a spider is used therebetween (as in Fig. 6) the arms of such spider, such as the arm 33, are preferably contoured, as best shown in Fig. 8, in order to facilitate the translation or change in direction of the air stream, thereby minimizing sonic or ultrasonic vibrations.

It is to be understood that although specific reference has been made in the description given hereinabove to a blade such as the blade 40 in the upper impeller section 20', the same considerations apply to the blades used in the lower impeller section 21'. Some increase in the root angle of the discharge stage or stages of the impeller over the root angle employed on the blades of the initial section or sections of the impeller is indicated.

In order to facilitate control of an aircraft employing the aerodynamic units of this invention, vanes or deflectors are preferably employed adjacent inlet and outlet ports of the passageway. Variations in the direction of thrust may thus be attained, and horizontal stability, banking and turning are facilitated. Such deflectors may take the form of blades or deflectors which can be controllably introduced into the stream of air passing through the passageway. For example, as illustrated in Figs. 6 and 7, vanes such as 50 and 50' in the form of blades may be positioned at a plurality of points around the inlet port of the passageway, each of said vanes being controllably operated by suitable servo mechanism, such as, for example, the hydraulic cylinders 51 and 51'. If, for example, the deflector 50 is moved into the dash line position, the quantity of air admitted to the forward part of the passageway facing the entering edge of the unit is reduced, thereby changing the characteristics and the effectiveness of the resulting jet, as well as influencing the amount of lift which is developed along the forward portion of the upper surface 11'. The various deflectors may be operated independently or in unison.

Similarly, vanes, such as the vanes 52 and 52', under the controllable actuation of suitable servo mechanisms, such as the hydraulic cylinders 53 and 53', may be caused to extend into the jet and produce resultant forces which affect the attitude of the entire aircraft. Such vanes are particularly effective in facilitating vertical ascent of the aircraft from the ground and are also of value in facilitating gliding descent and landings. It is to be understood that certain of the vanes and deflectors may be interconnected or operated in unison so as to accentuate the effect, as for example, by concurrently operating an aft deflector such as 50' and a forward vane such as 52. It may be noted at this time that by selecting and impeding a segmental portion of airflow through said passageway an unbalance in airflow velocity is produced with resultant unbalance in air reaction, thereby permitting lateral or longitudinal control of the aircraft.

Tests conducted with the construction described hereinabove show that more than 25 lbs. lift per square foot of the impeller disc area (swept area) or passageway can be readily attained, with lifts of 40 lbs. per square foot not unusual. In comparison, the conventional helicopter generates a lift of approximately 2–4 lbs. per square foot of the rotor blade diameter (swept area)

and for reasons of solidity, tip speed, etc., these figures cannot be materially increased by the use of conventional helicopter design. By reason of the compact character of the means employed herein, lift per square foot can be materially increased without difficulties. Similarly, the aerodynamic unit of the present invention generates approximately 2-3 times as much lift per horse power as is possible with conventional helicopter design.

Figure 9:
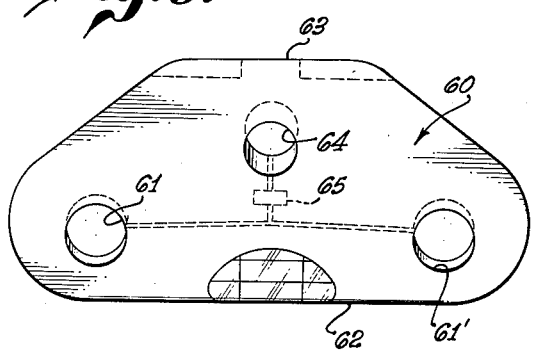
Fig. 9 is a plan view, partly diagrammatic, of a modified form of aircraft embodying the present invention.

It is to be understood that the invention is not limited to the utilization of but a single passageway in an aircraft. Fig. 9 diagrammatically shows, in plan form, an aircraft provided with a body 60 provided with two passageways 61 and 61' extending therethrough, the axes of such passageways being slightly inclined, say at an angle of 85° to a plane passing through the entering and trailing edges of the body, such edges being indicated at 62 and 63, respectively. These two passageways may be spaced from the longitudinal axis of symmetry of the body 60. In alignment with such longitudinal axis of symmetry is another passageway 64 which is downwardly and rearwardly inclined at a material angle to the chord, say at an angle of 30° to such chord. Each of such passageways may be provided with means for producing flow of air over the upper convex surface of the body 60 and discharging such air in the form of downwardly and rearwardly directed, high velocity jets. Vertical ascent and hovering may be controlled by passageways 61 and 61'; increased high forward velocity may be attained by the energization of the jet-creating means in passageway 64. All of the means (such as, for example, the impellers of the character described hereinbefore) may be driven from a common motor indicated at 65, suitable clutch or other selective means being employed for controllably actuating the impellers in passageway 64.

Those skilled in the art will readily appreciate that the aerodynamic unit of the present invention may be embodied in various forms of aircraft and one or more of the lift-generating and thrust-producing means may be embodied in an aircraft. Furthermore, the impellers of the present invention need not be employed as the sole means for generating lift and thrust; such impellers may be used in combination with turbo-jet or ram-jet engines as a means of feeding large volumes of air into the combustion chambers of engines, the exhaust from such engines being utilized in producing added thrust.

All changes and modifications coming within the scope of the appended claims are embraced thereby.

I claim:

1. An aerodynamic unit comprising, in combination with a body having an upper, generally convex surface and a lower, generally convex surface and having air foil characteristics in longitudinal section, margins of said upper and lower surfaces being connected, in part at least, to form entering and trailing edges: a port in the upper surface and an outlet port in the lower surface, said lower port being rearwardly displaced with respect to the upper port; an inclined passageway extending through the body and connecting said ports, said passageway being provided with a smooth, virtually imperforate wall, said wall being in continuous, curved, confluent, anastomotic relation to the upper surface of the body; a power-driven impeller mounted for rotation within said passageway about an inclined axis coincidental with the axis of said passageway, said impeller including counter-rotating, torque-counteracting impeller sections, each impeller section carrying blades mounted upon a hub portion, said hub portion being correlated to the walls of the passageway to provide an annular air duct, each blade having a concave front face defined by a root line adjacent the hub, a generally radial inlet edge, a generally radial outlet edge, and an outer margin; the outer margin of each blade being at an angle of between 35° and 60° to the axis of rotation, such outer margin being in proximity to the wall of the passageway for a distance not materially shorter than the effective axial height of the air-moving impeller blades; said impeller being adapted to produce a vertical reaction in excess of 30 lbs. per square foot of area swept by the impeller.

2. An aerodynamic unit of the character stated in claim 1, wherein the outer margin of each blade is in advance of the root line by a radial angle of between 5° and 50°.

3. An aerodynamic unit of the character stated in claim 1, wherein the axis of said passageway is inclined downwardly and rearwardly at an angle of between 30° and 85° to a plane passing through the entering and trailing edges of the body.

4. An aerodynamic unit of the character stated in claim 1, wherein the ratio of hub area to total passageway area in a transverse plane adjacent the outlet is not less than 0.15 to 1.0.

5. An aerodynamic unit of the character stated in claim 1, wherein the axial height of each impeller section is in excess of 20% of its diameter.

6. An aerodynamic unit of the character stated in claim 1, including vanes adjustably and selectively positionable adjacent the port in the upper surface of the body.

7. An aerodynamic unit of the character stated in claim 1, including deflectors adjustably and selectively positionable adjacent the port in the lower surface of the body.

8. An aerodynamic unit of the character stated in claim 1, wherein the axis of the passageway is inclined downwardly and rearwardly at an angle of between 30° and 85° to a plane passing through the entering and trailing edges of the body and said axis passes through the center of gravity of the unit.

9. An aerodynamic unit of the character stated in claim 1, wherein the axis of the passageway is inclined at an angle of between 30° and 85° to a plane passing through the entering and trailing edges of the body and intersects such plane at a point located between 0.3 and 0.5 of the length of such plane from the leading edge.

10. An aerodynamic unit of the character stated in claim 1, wherein the axis of the passageway is inclined downwardly and rearwardly at an angle of between 30° and 85° to a plane passing through the entering and trailing edges of the body and the average diameter of said passageway comprises between about 0.1 and 0.4 of the length of the body between trailing edge and entering edge.

11. An aerodynamic unit of the character stated in claim 1, wherein the space within the body contains motor means and means for operatively and controllably connecting said motor means and impeller.

12. An aerodynamic unit of the character stated in claim 1, wherein the unit is provided with pitching, rolling, and directional controls independent of the impeller, comprising control surfaces at the trailing edge of the unit and means for selectively actuating said control surfaces.

13. An aerodynamic unit of the character stated in claim 1, wherein the hub portions are of a contour correlated with the walls of the passageway to produce an annular air duct of progressively decreasing area from the upper intake port to a zone adjacent the lower edge of the passageway.

14. An aerodynamic unit comprising, in combination with a body having an upper, generally convex surface and a lower, generally convex surface and having air foil characteristics in longitudinal section, margins of said upper and lower surfaces being connected, in part at least, to form entering and trailing edges: a port in the upper surface and an outlet port in the lower surface, said lower port being rearwardly displaced with respect to the upper port; a passageway extending through the body and connecting said ports, the axis of said passageway being inclined downwardly and rearwardly at an angle of between 30° and 85° to a plane passing through entering and trailing edges of the body, said passageway being provided with a smooth, virtually imperforate wall, said wall being in continuous, curved, confluent, anastomotic relation to the upper surface of the body; a power-driven impeller mounted for rotation within said passageway about an inclined axis coincidental with the axis of said passageway, said impeller including counter-rotating, torque-counteracting impeller sections, each impeller section carrying blades mounted upon a hub portion, said hub portions being correlated to the walls of the passageway to provide an annular air duct, each blade having a front face defined by a root line adjacent the hub, a generally radial inlet edge, a generally radial outlet edge, and an outer margin; the outer margin of each blade being at an angle of between 35° and 60° to the axis of rotation, such outer margin being in proximity to the wall of the passageway for a distance not materially shorter than the effective axial height of the air-moving impeller blades; the space within the body containing motor means and means for operatively and controllably connecting said motor means and impeller; said impeller being adapted to produce a vertical reaction in excess of 30 lbs. per square foot of area swept by the impeller; said unit being provided with pitching, rolling and directional controls independent of the impeller, comprising control surfaces at the trailing edge of the unit, and means for selectively actuating said control surfaces.

15. An aerodynamic unit of the character stated in claim 14, wherein the outer margin of each blade is in advance of the root line by a radial angle of between 5° and 50°

16. An aerodynamic unit of the character stated in claim 14, wherein the axial height of each impeller section is in excess of 20% of its diameter.

17. An aerodynamic unit of the character stated in claim 14, wherein the axis of the passageway passes through the center of gravity of the unit and the ratio of the hub area to total passageway area in a transverse plane adjacent the outlet is not less than 0.15 to 1.0.

18. An aircraft comprising: a body having an upper, generally convex surface and a lower, generally convex surface imparting airfoil characteristics thereto; a plurality of intake ports in the upper surface, said ports being in spaced relation, and a plurality of outlet ports in the lower surface, each of said outlet ports being correlated to one of the intake ports; a passageway provided with a virtually imperforate wall, extending through the body and connecting each of said intake ports with its correlated outlet port, the walls being in an anastomotic relation to the upper surface to form curving, confluent intakes, the axes of said passageways being downwardly and rearwardly inclined at an angle of between 30° and 85° to a plane passing through the entering and trailing edges of the body, the distance between adjacent passageways being not less than three times the minimum diameter of a passageway; a power-driven impeller mounted for rotation in each passageway, each impeller carrying blades, the outer margins of each blade being rotationally in advance of the root of the blade, said outer margins being at an angle of between 35° and 60° to the axis of rotation and in proximity to the wall of the passageway; motor means mounted within the body and operably connected to said impellers; and control surfaces at the trailing edge of the unit for controlling pitching, rolling and direction of flight of the aircraft.

19. A device for generating high velocity fluid flow comprising: a driven shaft provided with a plurality of angularly extending blades in spaced relation, each blade having front face concave in section taken perpendicular to the shaft, each such face being defined by a root line adjacent the shaft, a generally radial inlet edge, a generally radial outlet edge and an outer edge, the inlet and outlet edges lying in planes perpendicular to the shaft axis, the outer edge of each blade being at an angle of between 35° and 60° to the shaft axis, the outer margin of each radial edge being in advance of the root margin of such edge by radial angle of between about 5° and 50°, the outer margins of the blades lying virtually in an imaginary cylinder, the axial height of the blades being in excess of 20% of the outer diameter of said blade assembly.

20. A device of the character stated in claim 19, in combination with a similar bladed assembly mounted upon a second shaft and assembly carried thereby being arranged for rotation in the opposite direction, with said second assembly in proximity to the first assembly and acting upon fluid discharged by the first assembly.

References Cited in the file of this patent

UNITED STATES PATENTS

| | | |
|---|---|---|
| 210,982 | Armit | Dec. 17, 1878 |
| 1,170,777 | Neal | Feb. 8, 1916 |
| 1,370,284 | Carlson | Mar. 1, 1921 |
| 1,449,100 | Hall | Mar. 20, 1923 |
| 1,785,333 | Trey | Dec. 16, 1930 |
| 1,822,386 | Andersen | Sept. 8, 1931 |
| 1,907,394 | Van Vactor | May 2, 1933 |
| 1,957,896 | Marguglio | May 8, 1934 |
| 2,077,471 | Fink | Apr. 20, 1937 |
| 2,253,066 | Dowell | Aug. 19, 1941 |
| 2,377,835 | Weygers | June 5, 1945 |
| 2,461,435 | Neumann | Feb. 8, 1949 |

FOREIGN PATENTS

| | | |
|---|---|---|
| 865,393 | France | Feb. 24, 1941 |